(12) United States Patent
Paker et al.

(10) Patent No.: US 9,124,459 B2
(45) Date of Patent: Sep. 1, 2015

(54) BRANCH PROCESSING OF SEARCH TREE IN A SPHERE DECODER

(75) Inventors: Özgün Paker, Eindhoven (NL); Sebastian Eckert, Burgstaedt/Mohsdorf (DE); Sebastien Mouy, Eindhoven (NL)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 13/518,437

(22) PCT Filed: Dec. 30, 2010

(86) PCT No.: PCT/EP2010/070946
§ 371 (c)(1),
(2), (4) Date: Jun. 22, 2012

(87) PCT Pub. No.: WO2011/080326
PCT Pub. Date: Jul. 7, 2011

(65) Prior Publication Data
US 2012/0269303 A1     Oct. 25, 2012

Related U.S. Application Data

(60) Provisional application No. 61/294,524, filed on Jan. 13, 2010.

(30) Foreign Application Priority Data

Dec. 30, 2009   (EP) .................................... 09180937

(51) Int. Cl.
*H04L 27/06*     (2006.01)
*H04L 25/03*     (2006.01)

(52) U.S. Cl.
CPC ................................ *H04L 25/03242* (2013.01)

(58) Field of Classification Search
CPC ..... H04L 25/03242; H04L 1/005; H04L 1/04; B29C 66/71
USPC ............................... 375/341, 340, 267; 703/2
See application file for complete search history.

(56) References Cited

U.S. PATENT DOCUMENTS

2009/0232232 A1*   9/2009   Duvaut et al. ................. 375/260
2010/0054372 A1*   3/2010   Eckert .......................... 375/340

FOREIGN PATENT DOCUMENTS

WO     2006/029546 A2     3/2006
WO     WO 2007107955 A2 *   9/2007

OTHER PUBLICATIONS

Huang et al. (Xinming Huang et al., "System Architecture and Implementation of MIMO Sphere Decoders on FPGA", 2008, IEEE, total of 10 pages).*

(Continued)

*Primary Examiner* — Sam K Ahn
*Assistant Examiner* — Fabricio R Murillo Garcia
(74) *Attorney, Agent, or Firm* — Patent Portfolio Builders PLLC

(57) ABSTRACT

Sphere decoding of signals for MIMO detection involves a first distance processor arranged to determine a distance between symbols of a received symbol vector and possible transmit symbols, in a search sequence according to a search tree. A line from root to leaf of the search tree represents a possible transmit symbol vector and the sequence of processing root level symbols can be ordered with respect to increasing distance without explicit sorting of the root level symbols based on distance calculations. A next symbol in the sequence is determined, based on a symbol currently being processed by the first distance processor, and a second distance processor determines the distance in respect of the next symbol in the search sequence for the same possible transmit symbol vector, in parallel with the determining of the distance in respect of the current symbol by the first distance processor.

27 Claims, 5 Drawing Sheets

(56) References Cited

OTHER PUBLICATIONS

Widdup et al. (Benjamin Widdup et al., "A Highly-Parallel VLSI Architecture for a List Sphere Detector", 2004, IEEE, total of 6 pages).*

Extended European Search Report issued in corresponding European application No. 09 18 0937, completion date May 31, 2010.

Widdup, Benjamin et al., "A Highly-Parallel VLSI Architecture for a List Sphere Detector", Communications, 2004 IEEE International Conference, Paris, France, Jun. 20-24, 2004, IEEE, Piscataway, NJ, USA, LNKD-DOI:10.1109/ICC.2004.1313025, vol. 5, Jun. 20, 2004, pp. 2720-2725, XP010709734, ISBN: 978-0-7803-8533-7.

Huang, Xinming et al., "System Architecture and Implementation of MIMO Sphere Decoders on FPGA", IEEE Transactions on Very Large Scale Integration (VLSI) Systems, IEEE Service Center, Piscataway, NJ, USA, LNKD-DOI:10.1109/TVLSI.2007.912042, vol. 16, No. 2, Feb. 1, 2008, pp. 188-197, XP011199260, ISSN: 1063-8210.

Knagge, Geoff et al., "An Optimised Parallel Tree Search for Multiuser detection with VLSI Implementation Strategy", Global Telecommunications Conference, 2004, GLOBECOM '04, IEEE, Dallas, TX, USA, Nov. 29-Dec. 3, 2004, Piscataway, NJ, USA, LNKD-DOI:10.1109/GLOCOM.2004.1378445, vol. 4, Nov. 29, 2004, pp. 2440-2444, XP010757966, ISBN: 978-0-7803-8794-2.

Studer, Christoph et al., "Soft-Output Sphere Decoding: Algorithms and VLSI Implementation", IEEE Journal on Selected Areas in Communications, IEEE Service Center, Piscataway, NJ, USA, LNKD-DOI: 10.1109/JSAC.2008.080206, vol. 26, No. 2, Feb. 1, 2008, pp. 290-300, XP011200796, ISSN: 0733-8716.

International Search Report issued in corresponding International application No. PCT/EP2010/070946, mailing date Mar. 30, 2011.

Written Opinion of the International Searching Authority issued in corresponding International application No. PCT/EP2010/070946, mailing date Mar. 30, 2011.

International Preliminary Report on Patentability issued in corresponding International application No. PCT/EP2010/070946, date of issuance Jul. 4, 2012.

* cited by examiner

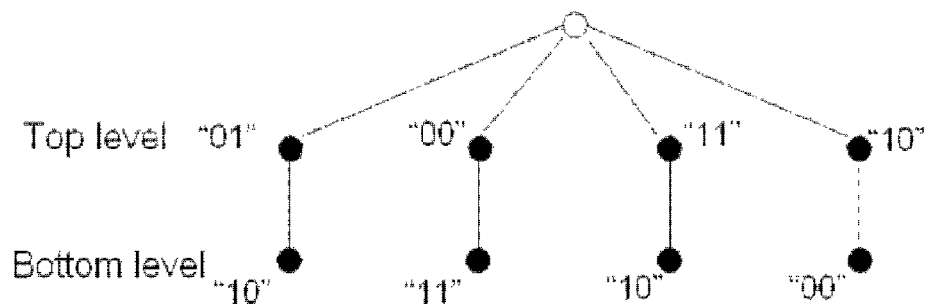
FIG 4
FIG 5
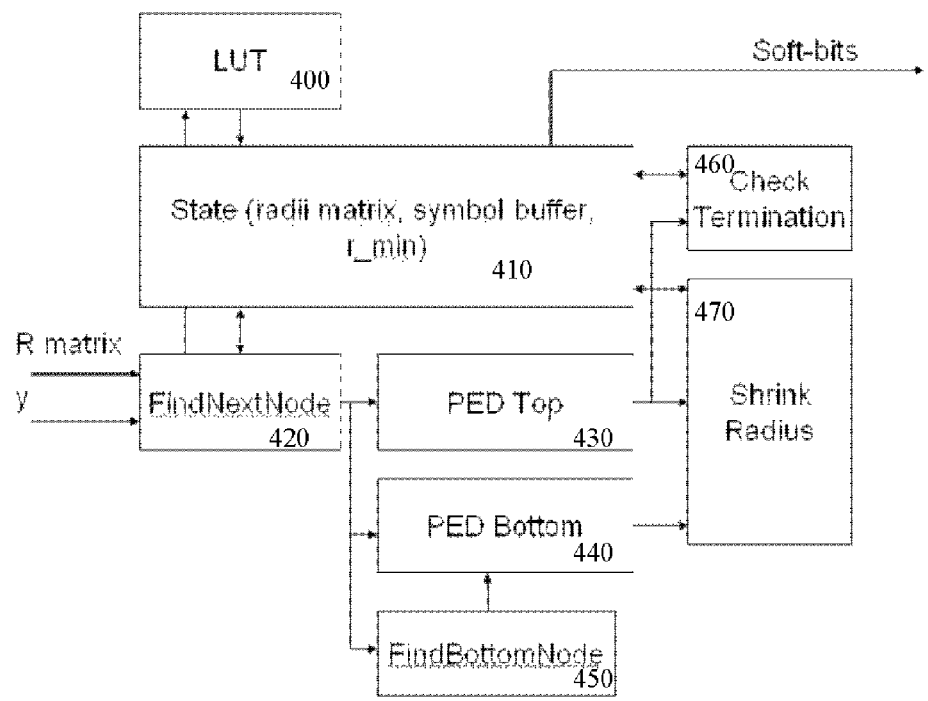

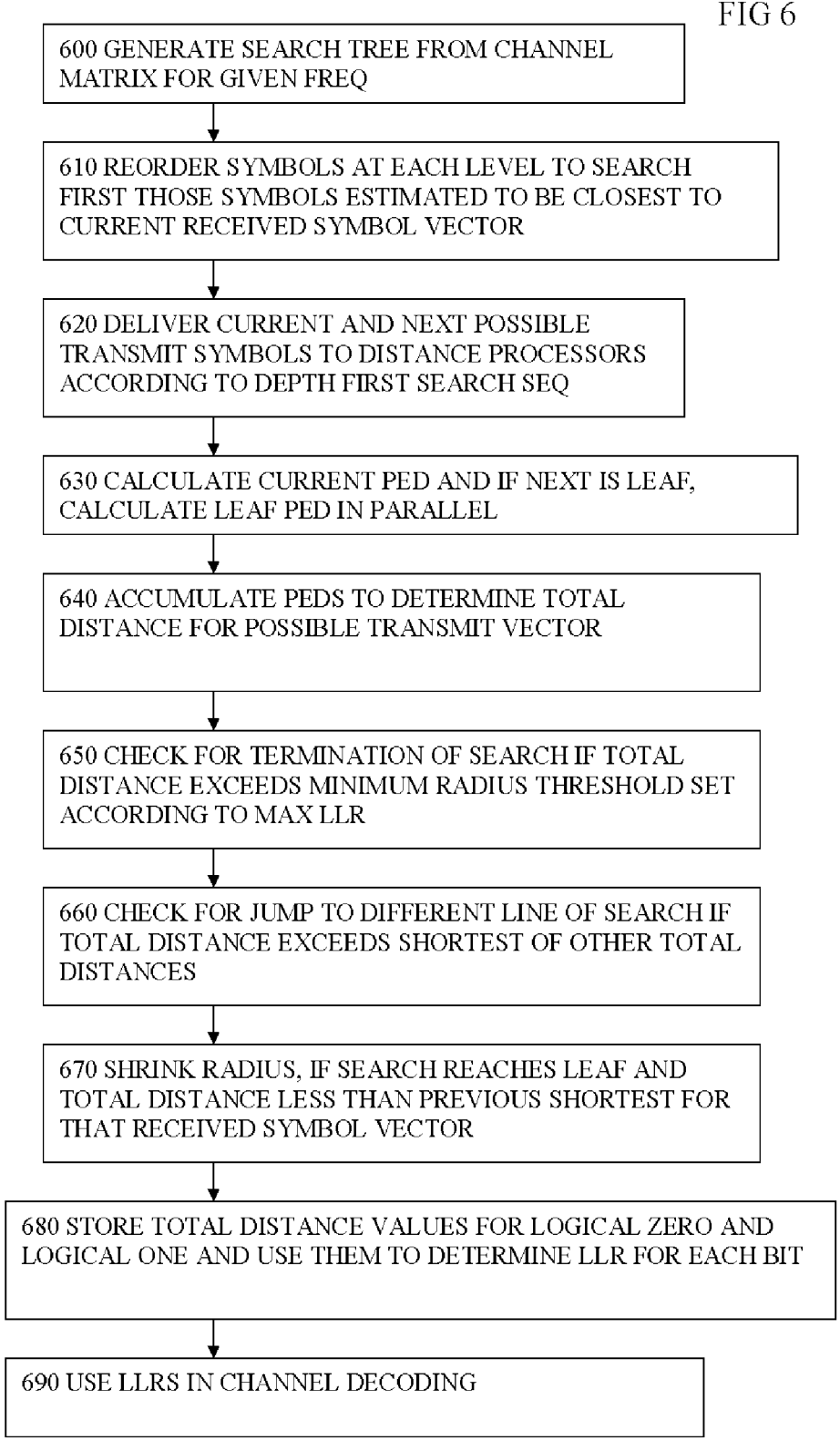

BRANCH PROCESSING OF SEARCH TREE IN A SPHERE DECODER

BACKGROUND OF THE INVENTION

Field of the invention: This invention relates to apparatus and methods for sphere decoding of signals for MIMO detection, to receivers having such apparatus, and to corresponding computer programs for carrying out such methods.

Sphere decoding is a known algorithm and is regarded as providing the best BER vs. SNR (average bit error rate given a certain signal to noise ratio) for multi antenna communication systems using MIMO (Multiple input multiple output) based receivers (e.g. cellular (LTE), connectivity (WLAN IEEE 802.11n), etc.) and therefore can be a key part of a baseband processor for such systems. These methods involve determining the shortest Euclidean distance to ascertain the symbol vector which was transmitted with the greatest degree of probability. These approaches are thus used for sphere decoding for a hard decision receiver concept or producing log likelihood ratios for a soft decision output.

SUMMARY OF THE INVENTION

An object of the invention is to provide improved apparatus or methods. According to a first aspect, the invention provides:

Apparatus for sphere decoding of signals for MIMO detection, to deduce a transmit symbol vector from a received symbol vector, the apparatus having: a first distance processor arranged to determine a distance between one or more received symbols of a received symbol vector and one or more of possible transmit symbols transmitted from one of a number of transmit antennas, and to repeat this for others of the possible transmit symbols and others of the transmit antennas, in a search sequence according to a search tree of the possible transmit symbols at each of the transmit antennas, a unit arranged to determine a total distance for a possible transmit symbol vector based on a set of distances determined for different ones of the transmit antennas, and a comparator arranged to compare the total distance to a threshold, to determine if the search sequence can be stopped, the apparatus also having a unit arranged to determine a next symbol in the sequence for distance processing, based on a symbol currently being processed by the first distance processor, and a second distance processor arranged to determine the distance in respect of the next symbol, or any further symbol in the search sequence for the same possible transmit symbol vector, in parallel with the determining of the distance in respect of the current symbol by the first distance processor, before determining the total distance for that possible transmit symbol vector.

By looking ahead to the next symbol, or any further symbol in the sequence and determining its distance in parallel, without waiting to see if the sequence jumps away from that next symbol, the processing can be speeded up or use less resources such as silicon area on an integrated circuit. This is based on an appreciation that the waste of computing resource from the occasions that the sequence jumps away from that next symbol, and did not need to process it, is usually much less than the gains from processing the symbols in parallel.

In such an apparatus, calculation may be made of a distance representing how close is the received symbol vector to each of many possible transmitted symbol vectors, and the shortest distance so obtained can be taken as showing which is the most likely transmitted symbol vector. The process of finding a transmitted symbol vector having the shortest distance can be treated as a search through a network of nodes, each node representing a different choice. Order of processing nodes or tree expansion in accordance with some embodiments of the present invention is depth first. This is more efficient than breadth first as in the latter many of the sibling nodes will be unnecessarily processed and node processing means distance calculation, i.e. consumption of resources. The determination of the next symbol, or any further symbol in the search sequence for the possible transmit symbol vector, in parallel with the determining of the distance in respect of the current symbol may be done by a parallel processing of nodes in depth first order, i.e. processing of one node at the top layer and computing the next node and processing that node in parallel with the first node. This means that different levels of the search tree are typically processed in parallel. The depth first mechanism may be combined with ordering the symbols according to their increasing distances, so that the closest are considered first, making it easier to decide when the search for that particular vector can be terminated, with a minimum of wasted search time, or a minimum of waste of calculation resource, in other words deciding optimally where to prune the tree. In particular the order, especially at the top level of the search tree, in accordance with embodiments of the present invention, may be determined without calculating any Euclidean distance, i.e. no explicit sorting or ranking of the top level symbols using distance calculations. For example, in embodiments parallel processing comprises distance calculation of successsive symbols from root to leaf e.g. in a branch processor and accumulation of the distances whereby the order of the processing is one branch at a time, top layer symbols of the tree being ordered w.r.t. increasing distance, i.e. without explicit sorting based on actual distance calculations. Instead of using explicit sorting, e.g. to obtain a sorted stack, some embodiments of the present invention make use of an LUT.

In accordance with some embodiments of the present invention, processing is at different levels of the tree in parallel. Further, a decoder in accordance with some embodiments of the present invention can processes two metric computation steps in one cycle, i.e. can process 2 nodes per cycle.

In accordance with another aspect, which can be an independent aspect of the present invention, an apparatus is provided for sphere decoding of signals for MIMO detection, to deduce a transmit symbol vector from a received symbol vector, the apparatus having:

a distance processor, arranged to determine a distance between one or more received symbols of a received symbol vector and one or more of possible transmit symbols transmitted from one of a number of transmit antennas, and to repeat this for others of the possible transmit symbols and others of the transmit antennas, in a search sequence according to a search tree of the possible transmit symbols at each of the transmit antennas, a line from root to leaf of the search tree representing a possible transmit symbol vector, the sequence of processing root level symbols being ordered with respect to increasing distance without explicit sorting of the root level symbols based on distance calculations, a unit arranged to determine a total distance for a possible transmit symbol vector based on a set of distances determined for different ones of the transmit antennas, and a comparator arranged to compare the total distance to a threshold, to determine if the search sequence can be stopped.

This further aspect also includes a method of sphere decoding of signals for MIMO detection, to deduce a transmit symbol vector from a received symbol vector, the method having the steps of determining a distance between one or more received symbols of a received symbol vector and one or more of possible transmit symbols transmitted from one of a number of transmit antennas, and repeating this for others of the possible transmit symbols and others of the transmit antennas, in a search sequence according to a search tree of the possible transmit symbols at each of the transmit antennas, determining a total distance for a possible transmit symbol vector based on a set of distances determined for different ones of the transmit antennas, comparing the total distance to a threshold, to determine if the search sequence can be stopped, a line from root to leaf of the search tree representing a possible transmit symbol vector and the sequence of processing root level symbols being ordered with respect to increasing distance without explicit sorting of the root level symbols based on distance calculations.

Embodiments of the invention can have any other features added, some such additional features are set out in dependent claims and described in more detail below.

Other aspects of the invention include corresponding receivers having such apparatus, corresponding methods, and corresponding computer programs for carrying out the methods. The present invention also includes that any of the functionality of the system may be implemented as hardware, or in a processing specially adapted with computer software, or combinations of both. The apparatus may include a general purpose processor, a digital signal processor (DSP), an application specific integrated circuit (ASIC), a field programmable gate array (FPGA) or other programmable logic device, discrete gate or transistor logic, discrete hardware components, or any combination designed to perform the functions described herein. A general purpose processor may be a microprocessor or state machine. A processor may also be implemented as a combination of computing devices, e.g., a combination of a DSP and a microprocessor, a plurality of microprocessors, one or more microprocessors in conjunction with a DSP core, or any other such configuration. The processor used in the client and/or server is adapted to carry out any method of the disclosure.

The present disclosure also includes a computer program product comprising code segments adapted for execution on any type of computing device, i.e. one including a processing engine. Software code in the computer program product, when executed on a computing device implements any of the methods of the prsent invention.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIG. 4 shows a 2×2 search tree, FIG. 5 shows apparatus according to another embodiment, and FIG. 6 shows steps according to another embodiment.

DETAILED DESCRIPTION OF EMBODIMENTS

Figure 1:
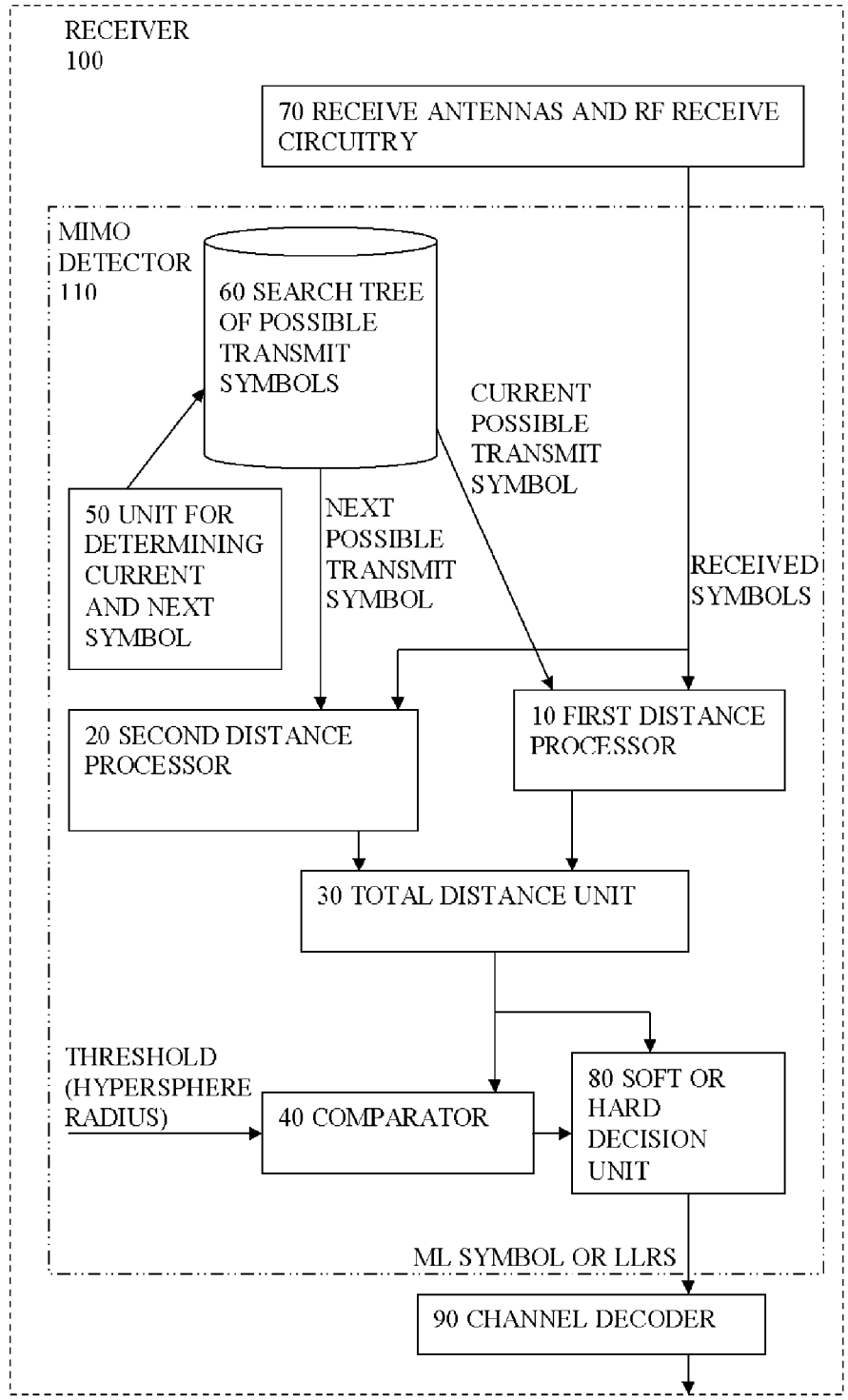
FIG. 1 shows a receiver and apparatus for MIMO detection according to a first embodiment.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention. References to a signal can encompass any kind of signal in any medium, and so can encompass an electrical or optical or wireless signal or other signal for example. References to a processor can encompass any means for processing signals or data in any form and so can encompass for example a personal computer, a microprocessor, analog circuitry, application specific integrated circuits, software for the same, and so on.

References to symbols are intended to encompass binary values such as one or zero, or hexadecimal values, or any other kind of symbols, numerical or otherwise, for representing information. They can be in the form of any kind of signal.

References to a unit or a part can encompass distinct hardware or software modules, or can encompass examples without a distinct hardware or software part, but where the function of that unit or part is carried out by a multifunction part or unit.

In the description provided herein, numerous specific details are set forth. However, it is understood that embodiments of the invention may be practiced without these specific details. In other instances, well-known methods, structures and techniques have not been shown in detail in order not to obscure an understanding of this description.

Introduction to Some Issues Addressed by Some of the Embodiments

By way of introduction to the embodiments, some explanation of a MIMO system will be provided. At a receiver, a symbol vector is received, composed of a symbol for each antenna at a given moment in time. The receiver needs to try to deduce what was the symbol vector that was transmitted, and there may be a large number of possible choices. It is possible to calculate a distance representing how close is the received symbol vector to each of the possible transmitted symbol vectors, and the shortest distance can be taken as showing which is the most likely transmitted symbol vector.

This process of finding the transmitted symbol vector having the shortest distance can be treated as a search through a network of nodes, each node representing a different choice. One difficulty is that the search space may be too big to try every node in the available time or with a reasonable amount of computing resource.

In a system with M transmit and N receive antennas, the N dimensional received vector is given by:

$$y = H \times s + n \tag{1}$$

where H denotes the channel matrix with N rows and M columns, and n represents the N dimensional additive complex Gaussian noise vector. In (1), s stands for the transmitted symbol vector. Entries of s are chosen independently from a complex constellation C (e.g. from a QPSK, 16-QAM, 64-QAM complex signal constellation. The symbols are complex numbers, each mapped to a unique bit pattern. For QPSK, there are four symbols in C such as $\{-1-i, -1+i, 1-i, 1+i\}$. The channel H is estimated at the receiver and may be different for each transmission frequency.

Sphere Decoding

The main idea in sphere decoding is to reduce the number of candidate symbol vectors to be considered in the search to only those points that lie inside a sphere with a certain radius r around the received point y given in (2).

$$d(s) = \|y - H \times s\|^2 < r^2 \tag{2}$$

Only imposing the constraint in (2) does not lead to an efficient implementation unless (2) can be checked other than exhaustively searching all possible symbol vectors, which amounts to $|C|^M$ in total. (For 64-QAM, 4 transmit antennas, this number is equal to $64^4$ i.e. 16,777,126 possible vectors to try). A known method that enables reduced complexity is tree pruning.

The matrix in H can be triangularized using a QR decomposition according to H=QR where N×M matrix Q has the useful property that $Q^{-1} = Q^H$ ($Q^H$ denotes hermitian transpose). R is an M×M matrix that is upper triangular i.e. elements below the diagonal are zero. Rewriting (2) using QR decomposition leads to (3)

$$d(s) = c + \|\bar{y} - R \times s\|^2 < r^2 \tag{3}$$

with $\bar{y} = Q^H y$. In (3), the constant c is independent of the data symbol and can be ignored in the metric computation. The squared distance $d(s) = T_1(s)$ can be computed recursively as:

$$T_i(s^i) = T_{i+1}(s^{i+1}) + \left| \bar{y} - R_{ii}s_i - \sum_{j=i+1}^{M} R_{ij}s_j \right|^2 ; i = 1, 2, \cdots M \tag{4}$$

In (4), $T_{M+1}(s^{M+1}) = 0$, and $s^i = [s_i s_{i+1} \ldots s_M]^T$. One can now associate all possible vectors $s^i$ and the respective path metrics $T_i(s^i)$ with nodes on the $i^{th}$ level of a tree, the root of which is at i=M+1. Since the second term of (4) is positive, it can be concluded that whenever a path metric violates the sphere constraint given in (2), the path metrics of all the children will violate (2). Consequently there is no need to calculate the distances beyond this point, in effect the tree can be pruned above this node. This approach effectively reduces the number of vector symbols (i.e. leaves of the tree) to be checked. Equation (4) can be re-written as:

$$T_i(s^i) = T_{i+1}(s^{i+1}) + |b_{i+1} - R_{ii}s_i|^2, \tag{5}$$

where $$b_{i+1} = \hat{y} - \sum_{j=i+1}^{M} R_{ij}s_j.$$

The term $T_i(s^i)$ is also referred to as the Partial Euclidean Distance (PED). This metric belongs to a partial symbol vector, $s^i = [s_i s_{i+1} \ldots s_M]^T$ i.e. the path taken from the root of the tree to the $i^{th}$ level. Once the search is done i.e. the radius has been shrunk to a minimum, the solution i.e. the path from root to leaf that is found is the closest to the received signal vector. This solution is called the most likely (ML) transmitted symbol vector.

For an example with three transmit antenna, and three receive antenna, there are three PEDs which can be calculated as follows where r is a component of upper triangular matrix R $$d^2(s) = \left\| \begin{pmatrix} \hat{y}_1 \\ \hat{y}_2 \\ \hat{y}_3 \end{pmatrix} - \begin{pmatrix} r_{11} & r_{12} & r_{13} \\ 0 & r_{22} & r_{23} \\ 0 & 0 & r_{33} \end{pmatrix} \begin{pmatrix} s_1 \\ s_2 \\ s_3 \end{pmatrix} \right\|^2 \begin{array}{l} \to PED_1 \\ = \to PED_2 \\ \to PED_3 \end{array} \quad \text{(Eq. 6)}$$

$$d^2(s) = PED_1 + PED_2 + PED_3.$$

Figure 2:
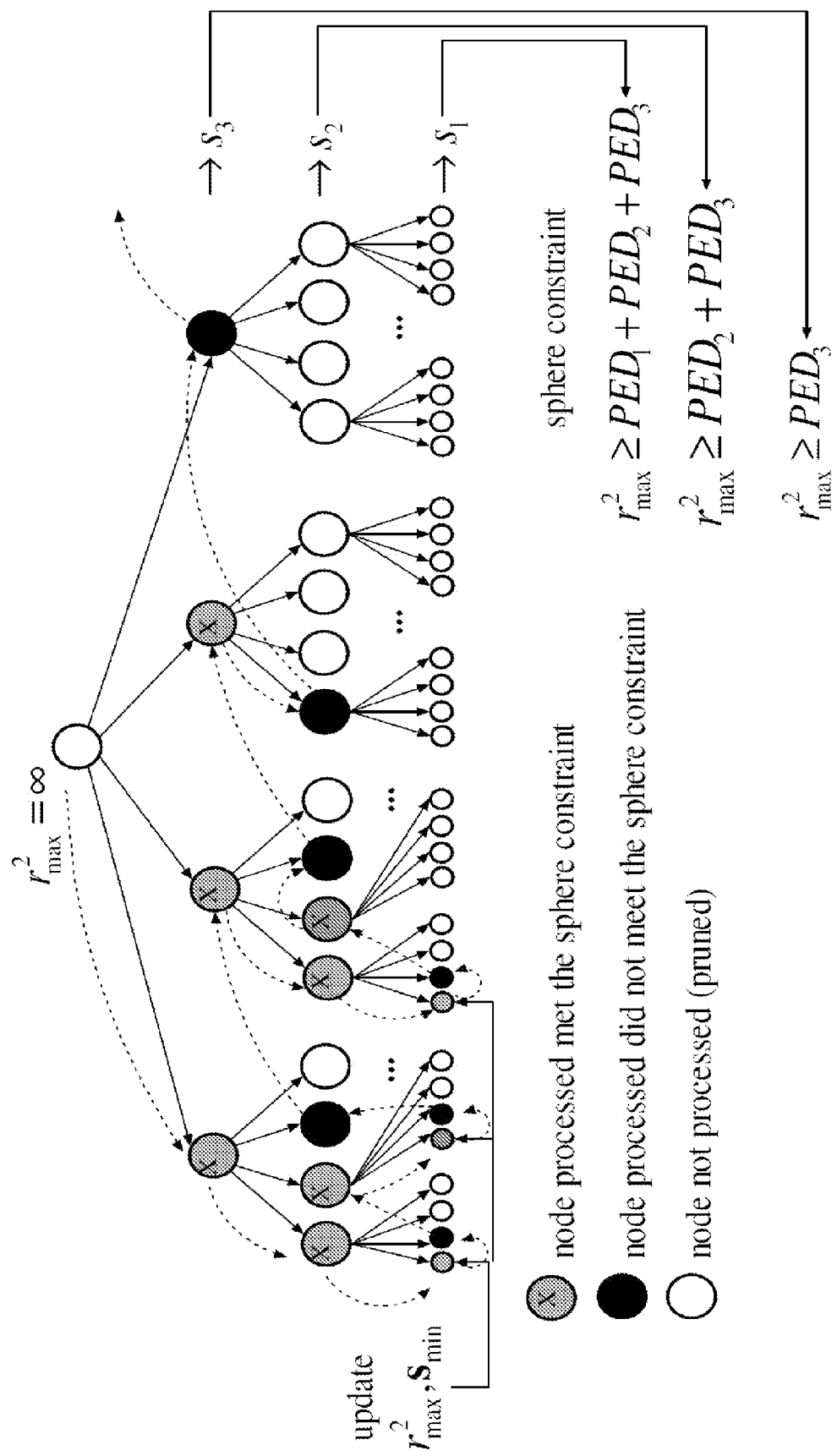
FIG. 2 shows a search tree.

As discussed above, to find the most probable symbol vector $s_{min}$ for which the euclidean distance in (6) is minimal, a maximum sphere radius $r^2_{max}$ is chosen where $s_{min}$ securely fits into. So $s_{min}$ is determined during a depth-first search and determined element-wise starting with its last element $s_{N_{Tx}}$. FIG. 2 shows the depth-first-search for $N_{Tx}=3$, $N_{Rx}=3$ and QPSK modulation for all transmit antennas. The search pointer traverses the tree downwards to the bottom unless the sphere constraint is met as follows:

$$\text{sphere constraint} \begin{cases} r^2_{max} \geq PED_3 & \text{for level 1} \\ r^2_{max} \geq PED_2 + PED_3 & \text{for level 2} \\ r^2_{max} \geq PED_1 + PED_2 + PED_3 & \text{for level 3} \end{cases} \quad \text{Eq (7)}$$

If this threshold in the form of the sphere constraint, is not met at any level, this means the total distance is already too great and cannot lead to a most likely symbol vector by continuing down the tree, so the search can "jump" to a different line. As will be explained in more detail below, this sphere constraint can be adjusted using a max LLR factor.

There are other ways of calculating the distance, for example a Manhattan distance could be used, with appropriate changes to the equations. The total Euclidean distance computed from root to leaf for the ML path corresponds to minimum distance for the corresponding bit pattern that makes up the ML symbol vector. In other words no other bit pattern that has the same bit value in one or more positions of the ML symbol vector can be closer to the received signal than the ML solution. This observation is important in the sense that it is utilized in computation of the soft bits later on. (Soft-bit computation is figuring out the minimum distance for each bit value 1 or 0, and subtracting these distances and scaling with the signal-to-noise ratio, as will be explained in more detail below.) So far these features are known in the literature.

An algorithm for sphere decoding is disclosed, for example, in "A new Reduced-Complexity Sphere Decoder For Multiple Antenna Systems", Albert M. Chan, Inkyu Lee, 2002 IEEE, "On the Sphere Decoding Algorithm I. Expected Complexity", B. Hassibi, H. Vikalo, IEEE Transactions on Signal Processing, vol. 53, no. 8, pp. 2806-2818, August 2005 and in "VLSI Implementation of MIMO Detection Using the Sphere Decoding Algorithm", A. Burg, M. Borgmann, M. Wenk, M. Zellweger, IEEE Journal of Solid State Circuits, vol. 40, no. 7, July 2005.

Depth First Search and Symbol Ordering

In order to prune the tree as early as possible hence reduce the symbol search space, typically a depth first search mechanism is employed. Other possibilities can be envisaged, such as a K-best search mechanism. This depth first mechanism is also combined with ordering the symbols according to their increasing PEDs, so that the closest are considered first, making it easier to decide when the search for that particular vector can be terminated, with a minimum of wasted search time, or a minimum of waste of calculation resource, in other words deciding where to prune the tree.

FIG. 2 shows an example of a tree for a 3×3 MIMO system employing QPSK. For instance at the top level of a tree corresponding to a first transmit antenna, there are four possible transmit symbols, which could be 00, 01, 10, and 11. They would be reordered so that the closest to the current symbol vector is searched first, so that when a calculated distance violates the sphere constraint, it is for sure that all the remaining nodes at the top level would fail the constraint and therefore the search could be ended.

In the depth first search scheme, tree traversal is performed as much as possible towards the leaves of the tree, and only when the sphere constraint fails, the search backtracks or "jumps" to a different line.

Depth first search combined with symbol ordering allows fast reduction of the radius and an early termination minimizing the number of visited nodes. Complexity of sphere search is proportional to the number of visited nodes.

Introduction to Features of the Embodiments

Embodiments can have a first distance processor arranged to determine a distance between one or more received symbols of a received symbol vector and one or more of possible transmit symbols transmitted from one of a number of transmit antennas, and to repeat this for others of the possible transmit symbols and others of the transmit antennas, in a search sequence according to a search tree of the possible transmit symbols at each of the transmit antennas, and a second distance processor arranged to determine the distance in respect of the next symbol in the search sequence for the same possible transmit symbol vector, in parallel with the determining of the distance in respect of the current symbol by the first distance processor, before determining the total distance for that possible transmit symbol vector.

Any features can be added, some are shown in the embodiments described. An additional feature is the search tree being arranged to have a branch point corresponding to each of the transmit antennas, so that a line from root to leaf of the search tree represents a possible transmit symbol vector and the search sequence is a depth first search sequence through the tree. This is a particularly effective way of organizing the search tree.

The second distance processor can be arranged to determine the distance for a symbol corresponding to a leaf of the search tree only. This tends to give more benefit than parallel distance determination of other parts of the search tree, though in some cases it may be applicable to other parts of the search tree.

Another addition feature is a unit for determining a likelihood ratio for each symbol of the possible transmit symbol vector based on the total distances in respect of logical one and logical zero bit values. This can give more complete information for further processing.

Another additional feature of some embodiments is the apparatus being arranged so that the threshold used to determine if the search sequence can be stopped, is made dependent on a maximum value of the likelihood ratio. This can enable the complexity or exhaustiveness search to be adjusted.

Another additional feature is that the unit for determining a next symbol in the search sequence is operable according to an estimate of which of the possible transmit symbols represents a next closest region to a corresponding symbol of the received symbol vector.

Another additional feature is the threshold being variable. This can help enable the tree to be pruned efficiently and can be implemented by a unit for shrinking the threshold if the determined distance is shorter than the threshold.

Some embodiments provide a receiver for a MIMO transmission system, the receiver having a MIMO detector and a channel decoder for decoding symbol vectors output by the MIMO detector, the MIMO detector having apparatus for sphere decoding as set out above.

FIGS. 1,2, Apparatus According to a First Embodiment of the Invention

FIG. 1 shows a schematic view of apparatus in a receiver for a MIMO detector using sphere decoding according to a first embodiment. This shows the parts of the receiver within the dashed line box, and those parts which form the MIMO detector within the dash-dot line box. There can be other parts not shown. The parts of the MIMO detector can in principle be implemented as hardware units having any degree of integration, or as software run by a general purpose processor. The detector has a store 60 having a search tree of possible transmit symbols. This feeds a current possible transmit symbol to a first distance processor 10, and a next possible transmit symbol to a second distance processor 20. The sequence can be controlled by a unit 50 for determining a current and next symbol, which can provide pointers to the store 60. Each of these distance processors is also fed with received symbols from receive antennas and RF circuitry 70 of the receiver. The distance processors feed a total distance unit 30 which accumulates the total distance for a given possible transmit symbol vector. The total distances are fed to a comparator 40 for determining whether the search has gone far enough and can be terminated, by comparing the total distance to a threshold (which can be regarded as a radius of a hypersphere centred on the received symbol vector. The comparator output can be fed back to the unit 50 for determining the current and next symbols. The total distances can be processed further in various ways. As shown they are fed to a soft or hard decision unit 80 which can find the shortest of the total distances and output a most likely symbol, or can output log likelihood ratios LLRs, or other values. In some cases, the receiver will have a channel decoder 90 for processing the symbols or LLRs according to how the channels may have been coded at the transmitter, for example by OFDM or other techniques.

FIG. 2 shows a representation of a search tree for a 3×3 system. Nodes are at three levels corresponding to three transmit antennas (not including a root node at the top). The nodes are reordered according to the received symbol vector to have the closest nodes at each level towards the left of the tree. The search starts at the left most line down the tree from the top and proceeds in a sequence shown by the dotted arrows. The nodes are drawn in different ways to show the outcome of the processing, so nodes having an "x" are found to have a total distance for the nodes along its line, within the sphere constraint. This means the search continues down that line towards the bottom. If the bottom is reached, the search moves along the bottom, which represents a new line. When the total distance for the respective line is greater than the sphere constraint, or is greater than a current shortest distance for another line, this is shown by a black node, and from there the search jumps to a new line at the next level up. Nodes not processed at all are shown as empty circles. Other arrangements of search trees and sequences through them can be envisaged.

As shown, the total distance for the nodes along the line is for the nodes of the top level (not including the root node), while for the next level it will be $PED_2+PED_3$. For the bottom level the total distance represents the total distance for a complete possible transmitted symbol, and is $PED_1+PED_2+PED_3$. The comparison to the sphere constraint is carried out by the comparator 40, the PEDs are determined by the distance processors, and the total distances are determined by the distance processors in FIG. 1. The second distance processor can either be arranged to calculate the middle level, $PED_2+PED_3$ in parallel with the calculation of the top level, $PED_3$, by the first distance processor, or the second distance processor can be arranged to calculate the bottom level $PED_1+PED_2+PED_3$ in parallel with the calculation of the middle level by the first distance processor. Another option would be to have the second distance processor arranged to calculate the bottom level $PED_1+PED_2+PED_3$ in parallel with the calculation of the top level by the first distance processor. Another option would be to have a third distance processor so that all three levels can be calculated in parallel. In each case, the unit 50 for determining the current and next symbols can be set up to control which levels are calculated by which of the distance processors.

Figure 3:
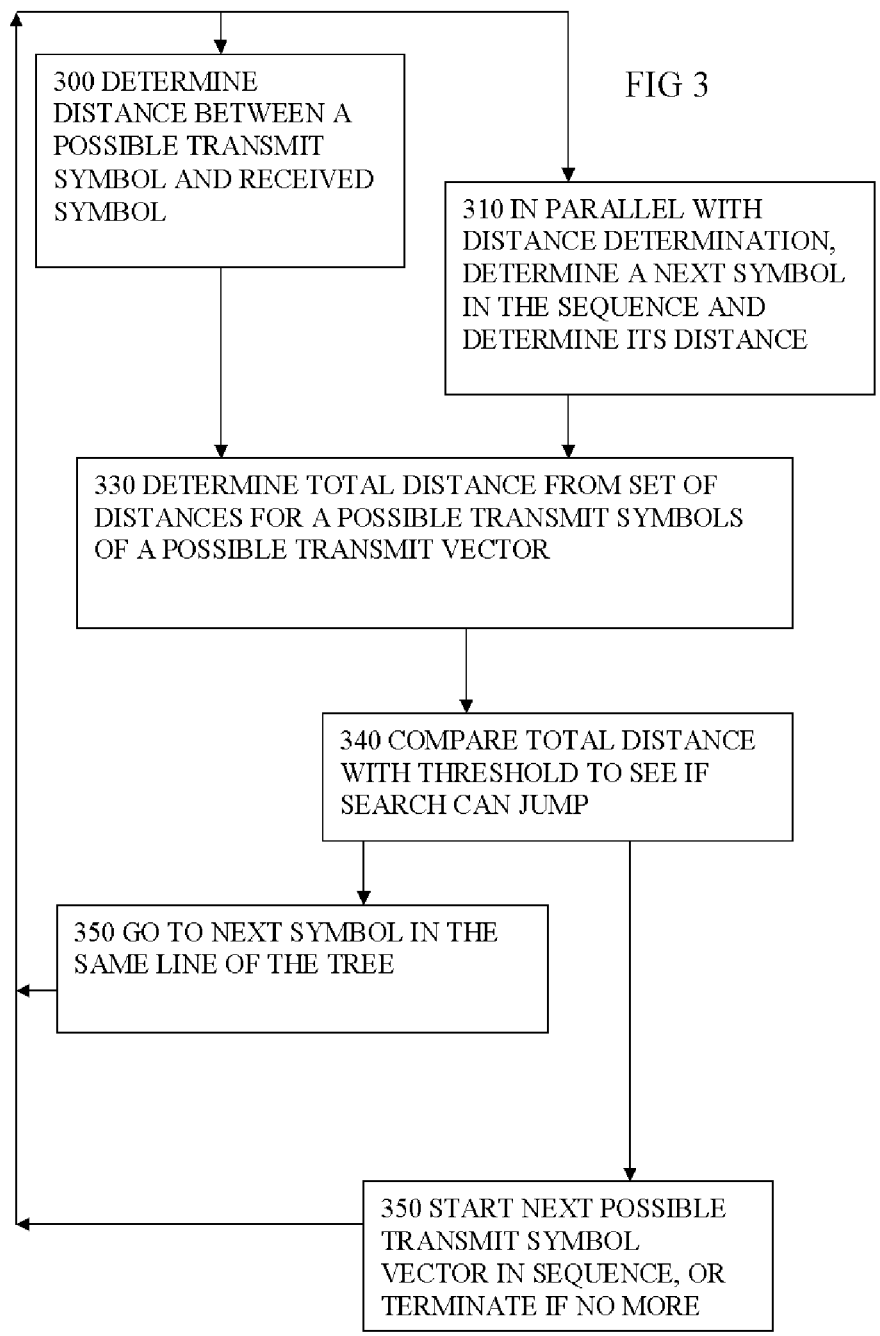
FIG. 3 shows steps according to an embodiment

FIG. 3, Method Steps in Sphere Decoding

FIG. 3 shows a flow chart of some of the operational steps of the embodiment of FIG. 1 or other embodiments. At steps 300 and 310 distances are determined in parallel for a current node and a next node. The distance determinations are repeated in a sequence according to a search tree. For each of the determined distances, at step 330, a total distance is determined from the set of distances determined for a given possible transmit vector (represented by a line through the tree in FIG. 2). At step 340 the total distance is compared with a threshold to see if the search along that line can be terminated and jump to another line. If not, at step 350, the search continues down the same line. Otherwise the search jumps to a new line representing a next possible transmit symbol vector, according to the sequence, as shown at step 360. If there are no more possible transmit vectors to process then the search can be terminated and the most likely transmit vector or vectors can be output for example, or log likelihood ratios be calculated and output.

FIG. 4, a Search Tree for a 2×2 Example

FIG. 4 shows a search tree for a 2×2 QPSK example. The nodes of the top level are ordered and stored in an LUT. This shows a tree for one search thread. There exists a similar tree like this one computed by swapping the columns of the channel matrix H. The symbols "01", "00" "11", "10" are ordered according to the increasing PEDs. In other words "10" has a higher PED compared to "11" which has a higher PED compared to "00" etc.

FIG. 5, Apparatus Block Diagram According to an Embodiment

FIG. 5 shows a block diagram of an implementation of a soft-sphere decoder according to an embodiment. It can be used for decoding a 2×2 MIMO system or 3×3 or larger. The blocks can in principle be implemented as hardware blocks or software modules. It assumes the search tree has been generated and reordered as described above. It has blocks which can process two nodes per cycle/iteration.

There is a FindNextNode block 420, fed by the R matrix, and received symbols y. This feeds three blocks, a first distance processor in the form of a PED Top unit 430, a second distance processor in the form of a PED bottom unit 440 and a FindBottomNode block 450. The outputs of the PED Top and Bottom blocks are fed to a shrink radius block 470, and a check termination block 460. A State block 410 stores a radii matrix, has a symbol buffer and stores a variable threshold r_min. The operation of each of the blocks will now be described in more detail, and with reference to a 2×2 MIMO system, that is having two transmit antenna and two receive antenna.

The computation starts by fetching the ordered top level symbols from the look-up table. The address is provided by the FindNextNode unit. The ordered symbols are stored in a symbol buffer (green shaded State box). The FindNextNode block fetches the first symbol from the top level (e.g. "01") and provides it to the PED computation unit where the partial Euclidean distance is computed.

The Check Termination unit can be arranged to check whether the PED is above the current radius (i.e. the minimum radius updated so far denoted as r_min in the State unit of FIG. 5) or whether the PED is smaller than the current radius but larger than the radii/distances belonging to bits "01" or the PED is smaller than both the minimum radius and the radii of "01". In the first case the whole search for the given received symbol vector terminates (and processing the next received symbol can start), as the symbols at the top level are ordered with increasing PED, there will not be any other top node with a PED that is smaller than the current radius. In the second case, the search can skip the bottom node of this path, and continue with the next top node. Because if the PED is larger than the radii of "01" bit pattern, than the PED of the bottom node which is positive will increase the distance and the total distance which is the sum of the PEDs would be even larger than the radii of "01". Hence there will not be an update of the current distance values of "01" bits at the top level. In other words there is no need to process the bottom node. In the third case, the search continues with the bottom node.

If the search continues to the bottom node, the FindBottomNode unit provides this node to the PED Bottom computation unit which then computes the total distance for this path ("01", "10"). The shrink radius unit shrinks the distance values of the top ("01") and also tries to shrink distances of the bottom node "10". (As explained in the soft bit output section below, there can be another search thread which works on a different tree where the columns of H are swapped. So in essence, the first thread tries to shrink the distances of "10" but it is the task of the other thread to terminate the search for the "10" bit pair belonging to symbol s2, representing the transmitted symbol from transmit antenna 2).

State Block:

This unit keeps track of state related variables for the execution of the sphere decoder. These variables are explained as follows.

The symbol buffer stores the top level symbols which are fetched during the start from the LUT and processed one by one until the search is terminated.

The radii matrix refers to the distance values for each bit. For each soft bit, two distance values have to be computed: one corresponding to the '0' value for the bit, and the other for the '1' value. This means for a 2×2 64-QAM MIMO, there are 2×2×6=24 distances to be computed. (2×2 MIMO means there are 2 symbol streams, 2 distances for each bit, and log2(64)=6 bits per symbol stream)

The r_min variable denotes the current minimum radius updated so far.

The Look-Up Table (LUT):

Given an address computed by the FindNextNode unit, the look-up table delivers top level symbols ordered according to their increasing PED. The order need not be absolutely correct, but through simulations can be optimized for negligible algorithmic performance loss. In an example it can hold 100 entries. The address is computed by the R matrix and the current received data vector which is rotated by the Q matrix.

FindNextNode Block

Its task is to deliver a node from the top level of the tree to the PED unit. For example this unit delivers nodes "01", "00", "11", and "10" in this order to the PED Computation unit. This unit also provides an address for the look up table to fetch the top level of the tree before starting the search. This address is computed based on the R matrix which is derived by QR decomposition of the channel and the received data rotated by the Q matrix denoted as y in FIG. 5.

FindBottomNode Block

Its task is, given the top node of the tree, to find the bottom node that succeeds the top node. For example "10" is a successor of "01" in the example given in FIG. 4. If the search proceeds to the bottom node in the next cycle, the PED Bottom unit assumes its input from this block.

PED Top Block

Its task is to compute the partial Euclidean distance of the symbol at its input. When the symbol is delivered from the FindNextNode unit, it computes the PED of the symbol, and accumulates the total distance of the previously determined PEDs for the same symbol vector and feeds it to the check termination part and the shrink radius part.

PED Bottom Block

This can be used for calculating the partial Euclidean distance of the symbol delivered from the FindBottomNode unit. It computes the PED of the symbol, accumulates the PEDs previously determined for the same symbol vector and feeds it to the check termination part and the shrink radius part.

Check Termination Block

The Check Termination unit checks whether the PED is above the current radius (i.e. the minimum radius updated so far denoted as r_min in the State unit of FIG. 5) or whether the PED is smaller than the current radius but larger than the radii/distances belonging to bits "01" or the PED is smaller than both the minimum radius and the radii of "01". In the first case the search terminates as the symbols at the top level are ordered with increasing PED, there will not be any other top node with a PED that is smaller than the current radius. In the second case, the search can skip the bottom node of this path, and continue with the next top node.

Shrink Radius Block

The task of this block is to shrink the variable r_min used as a distance threshold, whenever the search reaches a leaf and the total distance is lower than the shortest distance(s) found previously for that received symbol vector.

FIG. 6, Method Steps of an Embodiment

FIG. 6 shows a flow chart of steps in sphere decoding. At step 600, a search tree is generated from the channel matrix for each transmission frequency. At step 610, the symbols are reordered at each level of the tree, so that a search through the tree finds first those symbols estimated to be closest to the current received symbol vector. At step 620, current and next possible transmit symbols are delivered to the distance processors according to the depth first search sequence. The PED for the current node is calculated at step 630, and if the next node is a leaf node (it must be for a 2×2 system at least), then the PED of that leaf node is calculated in parallel.

The PEDs for the nodes for the current possible transmit symbol vector are accumulated to determine a total distance for that symbol vector at step 640. At step 650 there is a check to see if conditions for termination of the search are met, by comparing the total distance to a minimum radius threshold. This threshold can be set with an offset according to a maximum LLR constraint as described in more detail below.

At step 660 there is a check to see if the search can jump to a different line of search and skip the next node or nodes. This step may not be needed for a 2×2 system with parallel distance processing of two nodes at a time. The jump may be made if the total distance so far is longer than a total distance found for a previous line through the search tree.

At step 670, the minimum radius variable is shrunk if the search reaches a leaf node and the total distance is shorter than the total distances found for previous lines through the search tree. At step 680, a pair of shortest total distances in respect of each symbol of the vector is stored, being total distances in respect of the possible transmit symbol being a logical one or a logical zero. These can then be used to determine an LLR for each symbol of the transmitted symbol vector, as explained in more detail below. These LLRs can then be used in a subsequent channel decoding function at step 690.

Operational Considerations

Sometimes the PED Bottom block is not used because the action of the Check termination function can result in skipping a bottom node if all the distances belonging to the node above meet the criteria. In practice, it was found that skipping the bottom nodes only corresponds to 5% of the cases. But without the PED bottom block, two iterations/cycles would be needed to compute the last two nodes, which is the entire branch (path from root to bottom) for the case of a 2×2 tree. Hence by processing both nodes in parallel, the number of time or silicon area needed can be cut by nearly half. In a hardware example, this could use an extra 5-Kgates of logic, over the 15-Kgates of logic used by a single node processor design.

The Check termination block can become simpler for the 2×2 example, as either the search terminates by looking at the PED of the top symbol, or it continues with the next top-bottom node pair. Now terminating the search can be easily determined by just investigating whether the current PED exceeds the minimum radius or not.

For an example for a WLAN (802.11n) receiver, it can be shown there would be a need to process 3.7 G nodes/sec. There is also a need to process an OFDM symbol in a limited time-span (assuming here: 2.275 µs for QR decomposition and Sphere-search). This could be achieved by a system having 16 single node-processors (for QR-decomposition and Sphere-search) or 8 branch-processors for a parallel implementation, to implement a soft-decision sphere decoder. The overall speed increase or reduction in area for WLAN by using branch processors then can be around 33%. Assuming similar application requirements (3G nodes/sec), the design of a soft-sphere decoder for cellular (3G LTE) would imply the use of 12 node-processors, or 6 branch-processors. A similar speed increase or reduction in silicon area can be seen. Currently cellular and WLAN are the leading applications, but others can be envisaged.

Soft-Bit/Log-Likelihood Computation

Embodiments can have an optimized architecture for implementing a soft-decision sphere decoder. A soft-bit is a likelihood estimate whether a particular received bit is zero or one. Instead of deciding on the bit whether it is a 1 or 0, the soft-bit for that particular bit specifies how likely that bit is a 1 or 0. In other words, it is the probability ratio of the corresponding bit given in Eq.(8).

$$LLR_i = \log\left(\frac{p(b_i = 1 \mid r)}{p(b_i = 0 \mid r)}\right) \qquad \text{Eq. (8)}$$

As mentioned earlier, calculation of Eq. (8) is equivalent to calculating the minimum distances for each bit value. This example of a sphere decoder—whenever it reaches a leaf—is able to compute a total distance for the bit pattern of the transmit symbol vector corresponding path. Though a basic algorithm can find the ML solution, for LLR output, the algorithm is modified to compute distances for all the bits. Among others, one consequence is the need to define a radii matrix (radii refers to distances for each bit value) for each distance to be computed. For one bit, 2 distances are computed: one for the "1" value, and the other for the "0" value. I.e for first bit position there is a need to find the symbol vectors e.g. "1xxxxxxx", "0xxxxxxx" that has the closest distance to the received signal. One way to do this is to modify the search as follows: for a 2×2 receiver, two search trees are used: one for the original channel matrix, one for the H where the columns are swapped. The reason for this is that the search is only terminated at the top level of the tree. Therefore by swapping the symbols, hence the tree is such that the searches for bits that are transmitted from both transmit antennas are terminated separately. If designing a 3×3 system, there could be 3 search threads i.e. 3 different trees with different top levels corresponding to symbols s1, s2, s3 representing symbols transmitted from three different antennas. Obviously the search threads interact when the radii that needs to be shrunk match i.e. the one or more bits at the bottom level of one search thread match the bits at the top level of the other search tree or vice versa.

The soft-decision sphere decoder tries to minimize the relevant distances each time the search reaches the leaf of the tree. The overall search is finished when no more distance update is possible. As the search is channel dependent, the sphere decoder can be arranged to have a limit on the search time, because in a realistic radio application such as WLAN, 3G LTE, there are throughput and latency constraints that have to be fulfilled. Therefore, the search has to finish sometimes prematurely. Through simulations an acceptable early termination limit can be determined for WLAN or any particular application.

One particular option is to use a multiple radius search as shown in WO 2008062329. This shows reducing the calculation complexity for generating soft bit information by virtue of the fact that the iterative deepening search for each antenna is carried out in two substeps. In the first substep, when the last element of s is not assigned to the mth antenna, s is rotated in such a manner that m is associated with the last element of s, that the channel matrix H is likewise rotated and QR decomposition of the channel matrix H is carried out, that, in the second substep, the iterative deepening search is carried out using a search radius in the form of a vector.

Max LLR Constraint

A further feature of some embodiments is the use of a max LLR constraint. This involves adding an additional offset term to the sphere constraint. This can further reduce the amount of calculation in a less complex way than other multiple radius search techniques. Compared to the hard-decision sphere constraint given in Eq. (7) above, an additional offset term maxLLR can be added as follows.

sphere constraint $\qquad$ Eq. (9)

$$\begin{cases} \min\{r_{max}^2\} + \text{maxLLR} \geq PED_3 & \text{for level 1} \\ \min\{r_{max}^2\} + \text{maxLLR} \geq PED_2 + PED_3 & \text{for level 2} \\ \min\{r_{max}^2\} + \text{maxLLR} \geq PED_1 + PED_2 + PED_3 & \text{for level 3} \end{cases}$$

where maxLLR describes the maximal amplitude of the desired softbits.

Thus, the multiple radius search traverses the tree downwards at tree level l (continues at level l+1) as long as the sphere constraint given in (8) can be met. Once the sphere constraint cannot be met anymore, than the multiple radius search jumps or back-tracks the search to a next level up, level l−1. This offset of the sphere constraint enables the search down any line of the tree to be terminated earlier, and thus reduce wasted calculations. Notably this enables the trade off between BER and amount of calculation to be varied and optimised.

The LLRs computed by Eq. (8) are typically quantized to $N_{bit}$ bits, for input to a channel decoder e.g. a Viterbi or Turbo decoder, where typically $N_{bit} \leq 5$. Through this quantization a maximum amplitude maxLLR of the LLRs is defined, and can be varied according to a signal to noise ratio SNR of the system. For practical purposes, max LLR can be chosen such that more than 70% of the soft bits are saturated without a notable impact on the overall bit error rate BER.

Concluding Remarks

Above has been described a sphere decoding of signals for MIMO detection using a first distance processor (10, 430) arranged to determine a distance between symbols of a received symbol vector and possible transmit symbols, in a search sequence according to a search tree. A line from root to leaf of the search tree represents a possible transmit symbol vector and the sequence of processing root level symbols can be optionally ordered with respect to increasing distance without explicit sorting of the root level symbols based on distance calculations. A next symbol in the sequence is determined, based on a symbol currently being processed by the first distance processor, and a second distance processor (20, 440) determines the distance in respect of the next symbol in the search sequence for the same possible transmit symbol vector, in parallel with the determining of the distance in respect of the current symbol by the first distance processor.

Above has been described embodiments having an architectural design choice in implementing a basic block of the sphere decoder for a 2×2 or other system which can result in faster processing and/or a considerable reduction of overall silicon area in a hardware implementation compared to a conventional approach for key applications such as cellular (for example 3G Long Term Evolution LTE) and connectivity (for example wide area local area networks WLAN).

Other variations can be envisaged within the scope of the claims.

The invention claimed is:

1. An apparatus for sphere decoding of signals for Multiple Input Multiple Output (MIMO) detection, to deduce an actual transmit symbol vector from a received symbol vector, the apparatus comprising:
    a first distance processor configured to repeatedly determine a distance between a received symbol vector and a transmit symbol vector including a current symbol transmitted from one of transmit antennas, for different possible transmit symbols standing for the current symbol, in a search sequence according to a search tree whose each level corresponds to possible transmit symbols for a symbol transmitted by a specific one of the transmit antennas, wherein said received symbol vector comprises a received symbol for each receiving antenna following the transmit antenna transmitting the actual transmit symbol vector;
    a first unit configured to determine a total distance for a possible transmit symbol vector based on a set of distances determined for different ones of the transmit antennas,
    a comparator configured to compare the total distance to a threshold, to determine whether to stop the search sequence;
    a second unit configured to determine a next symbol in the search sequence for distance processing, the next symbol being at a different level in the search tree than the symbol currently being processed by the first distance processor; and
    a second distance processor configured to repeatedly determine the distance in respect of the next symbol in parallel with the first distance processor determining of the distance in respect of the current symbol, before the total distance is determined.

2. The apparatus of claim 1, the search tree being arranged to have a branch point corresponding to each of the transmit antennas, so that a line from root to leaf of the search tree represents a possible transmit symbol vector and the search sequence is a depth first search sequence through the tree.

3. The apparatus of claim 1, the second distance processor being arranged to determine the distance for a symbol corresponding to a leaf of the search tree only.

4. The apparatus of claim 1, further comprising:
    a third unit for determining a likelihood ratio for each symbol of the possible transmit symbol vector based on the total distances in respect of logical one and logical zero bit values, said likelihood ratio being determined according to the following expression $$LLR_i = \log\left(\frac{p(b_i = 1 \mid r)}{p(b_i = 0 \mid r)}\right),$$

wherein $LLR_i$ is the likelihood ratio for a bit $b_i$, $p(b_i=1/r)$ is a probability that the bit $b_i$ is 1 for a distance r, and $p(b_i=0/r)$ is a probability that the bit $b_i$ is 0 for the distance r.

5. The apparatus of claim 4, arranged so that the threshold used to determine if the search sequence can be stopped, is made dependent on a maximum value of the likelihood ratio.

6. The apparatus of claim 1, wherein the second unit for determining the next symbol in the search sequence is operable according to an estimate of which of the possible transmit symbols represents a next closest region to a corresponding symbol of the received symbol vector.

7. The apparatus of claim 1, the threshold being variable.

8. The apparatus of claim 1, wherein the apparatus is a part of a MIMO detector, which is included together with a channel decoder configured to decode symbol vectors output by the MIMO detector in a receiver for a MIMO transmission system.

9. A method of sphere decoding of signals for Multiple Input Multiple Output (MIMO) detection, to deduce an actual transmit symbol vector from a received symbol vector, the method comprising:
    repeatedly determining, by a first distance processor, a distance between a received symbol vector and a possible transmit vector a current symbol transmitted from one of transmit antennas, for different possible transmit symbols in a search sequence according to a search tree whose each level corresponds to possible transmit symbols at a specific one of the transmit antennas, wherein said received symbol vector comprises a received symbol for each receiving antenna following the transmit antenna transmitting the actual transmit symbol vector;
    determining a total distance for a possible transmit symbol vector based on a set of distances determined for different ones of the transmit antennas;
    comparing the total distance to a threshold, to determine whether to stop the search sequence;
    determining a next symbol in the search sequence for distance processing, the next symbol being at a different level in the search tree than the current symbol processed by the first distance processor; and
    determining, by a second distance processor, the distance in respect of the next symbol in parallel with the determining, by the first distance processor, of the distance in respect of the current symbol, before determining the total distance.

10. The method of claim 9, the search tree being arranged to have a branch point corresponding to each of the transmit antennas, so that a line from root to leaf of the search tree represents a possible transmit symbol vector and the search sequence is a depth first search sequence through the tree.

11. The method of claim 10, the determination of the next or further symbol being carried out for a symbol corresponding to a leaf of the search tree only.

12. The method of claim 9, further comprising:
determining a likelihood ratio for each symbol of the possible transmit symbol vector based on the total distances in respect of logical one and logical zero bit values, said likelihood ratio being determined according to the following expression $$LLR_i = \log\left\{\frac{p(b_i = 1 \mid r)}{p(b_i = 0 \mid r)}\right\},$$

wherein LLRi is the likelihood ratio for a bit bi, p(bi=1/r) is a probability that the bit bi is 1 for a distance r, and p(bi=0/r) is a probability that the bit bi is 0 for the distance r.

13. The method of claim 12, further comprising:
setting the threshold used to determine if the search sequence can be stopped, according to a maximum value of the likelihood ratio.

14. The method of claim 9, wherein the method is encoded in a program stored on a non-transitory computer readable medium to be executed by a computer processor.

15. An apparatus for sphere decoding of signals for Multiple Input Multiple Output (MIMO) detection, to deduce an actual transmit symbol vector from a received symbol vector, the apparatus comprising:
a distance processor configured to repeatedly determine a distance between a received symbol vector and a transmit vector including a current symbol transmitted from one of transmit antennas, for different possible transmit symbols standing for the current symbol, in a search sequence according to a search tree whose each level corresponds to possible transmit symbols for a specific of the transmit antennas, a line from root to leaf of the search tree representing a possible transmit symbol vector, the sequence of processing root level symbols being ordered with respect to increasing distance without explicit sorting of the root level symbols based on distance calculations;
another distance processor configure to determine the distance with respect to a next symbol in parallel with the distance processor determining the distance in respect of the current symbol, before a total distance is determined, the next symbol corresponding to a leaf of the search tree only;
a unit configured to determine a total distance for a possible transmit symbol vector based on a set of distances determined for different ones of the transmit antennas; and
a comparator configured to compare the total distance to a threshold, to determine whether to stop the search sequence.

16. The apparatus of claim 15, the search tree being arranged to have a branch point corresponding to each of the transmit antennas, and the search sequence is a depth first search sequence through the tree.

17. The apparatus of claim 15, further comprising:
a third unit for determining a likelihood ratio for each symbol of the possible transmit symbol vector based on the total distances in respect of logical one and logical zero bit values, said likelihood ratio being determined according to the following expression $$LLR_i = \log\left\{\frac{p(b_i = 1 \mid r)}{p(b_i = 0 \mid r)}\right\},$$

wherein LLRi is the likelihood ratio for a bit bi, p(bi=1/r) is a probability that the bit bi is 1 for a distance r, and p(bi=0/r) is the probability that the bit bi is 0 for the distance r.

18. The apparatus of claim 17, arranged so that the threshold used to determine if the search sequence can be stopped, is made dependent on a maximum value of the likelihood ratio.

19. The apparatus of claim 15, the second unit for determining the next symbol in the search sequence being operable according to an estimate of which of the possible transmit symbols represents a next closest region to a corresponding symbol of the received symbol vector.

20. The apparatus of claim 15, the threshold being variable.

21. The apparatus of claim 15, wherein the apparatus is used as a MIMO detector, which is part of a receiver usable by a MIMO transmission system, the receiver also including a channel decoder for decoding symbol vectors output by the MIMO detector.

22. A method of sphere decoding of signals for Multiple Input Multiple Output (MIMO) detection, to deduce a transmit symbol vector from a received symbol vector, the method comprising:
repeatedly determining, by a distance processor, a distance between a received symbol vector and a transmit vector including a current symbol transmitted from one of transmit antennas, different possible transmit symbols standing for the current transmit symbol, in a search sequence according to a search tree whose each level corresponds to possible transmit symbols for a symbol transmitted by a specific one of the transmit antennas, wherein distances with respect to at least two symbols at different levels in the search tree are determined in parallel;
determining a total distance for a possible transmit symbol vector based on a set of distances determined for different ones of the transmit antennas;
comparing the total distance to a threshold, to determine whether to stop the search sequence, a line from root to leaf of the search tree representing a possible transmit symbol vector and the sequence of processing root level symbols being ordered with respect to increasing distance without explicit sorting of the root level symbols based on distance calculations.

23. The method of claim 22, the search tree being arranged to have a branch point corresponding to each of the transmit antennas, and the search sequence is a depth first search sequence through the tree.

24. The method of claim 22, the determination of a next or further symbol being carried out for a symbol corresponding to a leaf of the search tree only.

25. The method of claim 22, further comprising:
determining a likelihood ratio for each symbol of the possible transmit symbol vector based on the total distances in respect of logical one and logical zero bit values, said likelihood ratio being determined according to the following expression $$LLR_i = \log\left\{\frac{p(b_i = 1 \mid r)}{p(b_i = 0 \mid r)}\right\},$$

wherein $LLR_i$ is the likelihood ratio for a bit $b_i$, $p(b_i=1/r)$ is a probability that the bit $b_i$ is 1 for a distance r, and $p(b_i=0/r)$ is a probability that bit $b_i$ is 0 for the distance r.

26. The method of claim 25, further comprising:
setting the threshold used to determine if the search sequence can be stopped, according to a maximum value of the likelihood ratio.

27. The method of claim 22, wherein the method is encoded in a program stored on a non-transitory computer readable medium to be executed by a computer processor.

* * * * *